(12) United States Patent
Oyabu

(10) Patent No.: US 10,158,417 B2
(45) Date of Patent: Dec. 18, 2018

(54) RADIO COMMUNICATION SYSTEM, RELAY STATION AND BASE STATION

(71) Applicant: KYOCERA CORPORATION, Kyoto (JP)

(72) Inventor: Takahiro Oyabu, Hachio-ji (JP)

(73) Assignee: KYOCERA Corporation, Kyoto (JP)

( * ) Notice: Subject to any disclaimer, the term of this patent is extended or adjusted under 35 U.S.C. 154(b) by 27 days.

(21) Appl. No.: 15/414,114

(22) Filed: Jan. 24, 2017

(65) Prior Publication Data
US 2017/0214453 A1    Jul. 27, 2017

(30) Foreign Application Priority Data

Jan. 25, 2016  (JP) ................................ 2016-011746

(51) Int. Cl.
*G01R 31/08* (2006.01)
*H04B 7/155* (2006.01)
*H04W 72/04* (2009.01)

(52) U.S. Cl.
CPC ..... *H04B 7/15507* (2013.01); *H04W 72/0433* (2013.01)

(58) Field of Classification Search
USPC .... 370/315, 231, 235, 247, 274, 310.2, 319, 370/324, 328, 330, 351, 492
See application file for complete search history.

(56) References Cited

U.S. PATENT DOCUMENTS

| 4,495,619 A   | * | 1/1985 | Acampora | H04B 7/212 370/207 |
| 2009/0235138 A1 | * | 9/2009 | Chang | H04L 1/1854 714/748 |
| 2010/0054137 A1 | * | 3/2010 | Deng | H04B 7/15592 370/247 |
| 2013/0100826 A1 | | 4/2013 | Namba et al. | |

FOREIGN PATENT DOCUMENTS

| JP | 2012-015867 A | 1/2012 |
| JP | 2014-233004 A | 12/2014 |

* cited by examiner

*Primary Examiner* — Phuongchau Ba Nguyen
(74) *Attorney, Agent, or Firm* — Studebaker & Brackett PC

(57) ABSTRACT

A radio communication system includes: a plurality of base stations; and a relay station, which relays communication between any one of the plurality of base stations and a terminal, wherein the plurality of base stations include a master station, which communicates with the relay station, and a peripheral base station, which does not communicate with the relay station, and wherein when a signal of a control channel of the master station is not able to be received, the relay station transmits a communication unavailable signal to the master station and the peripheral base station.

6 Claims, 5 Drawing Sheets

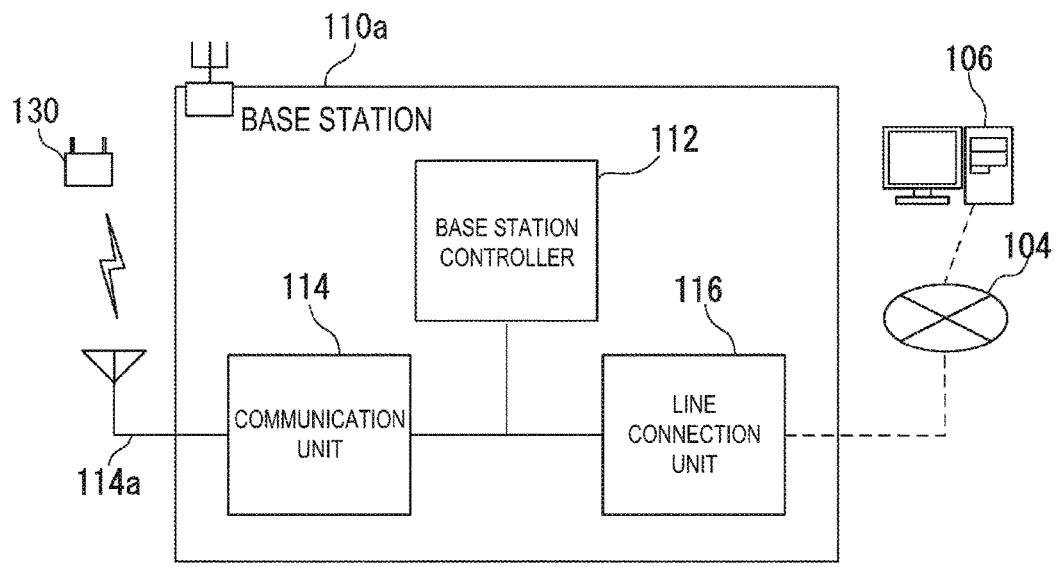
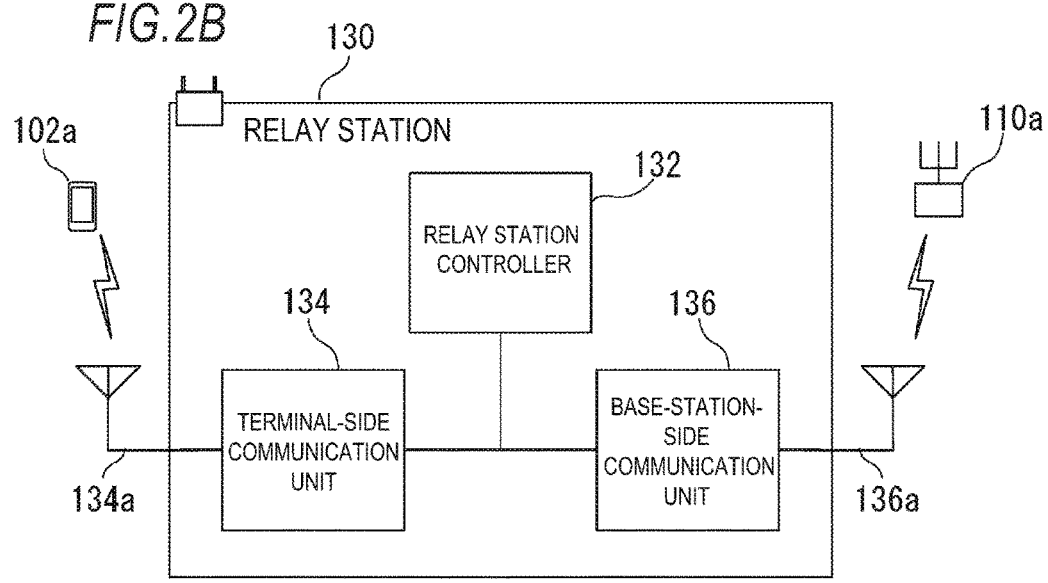

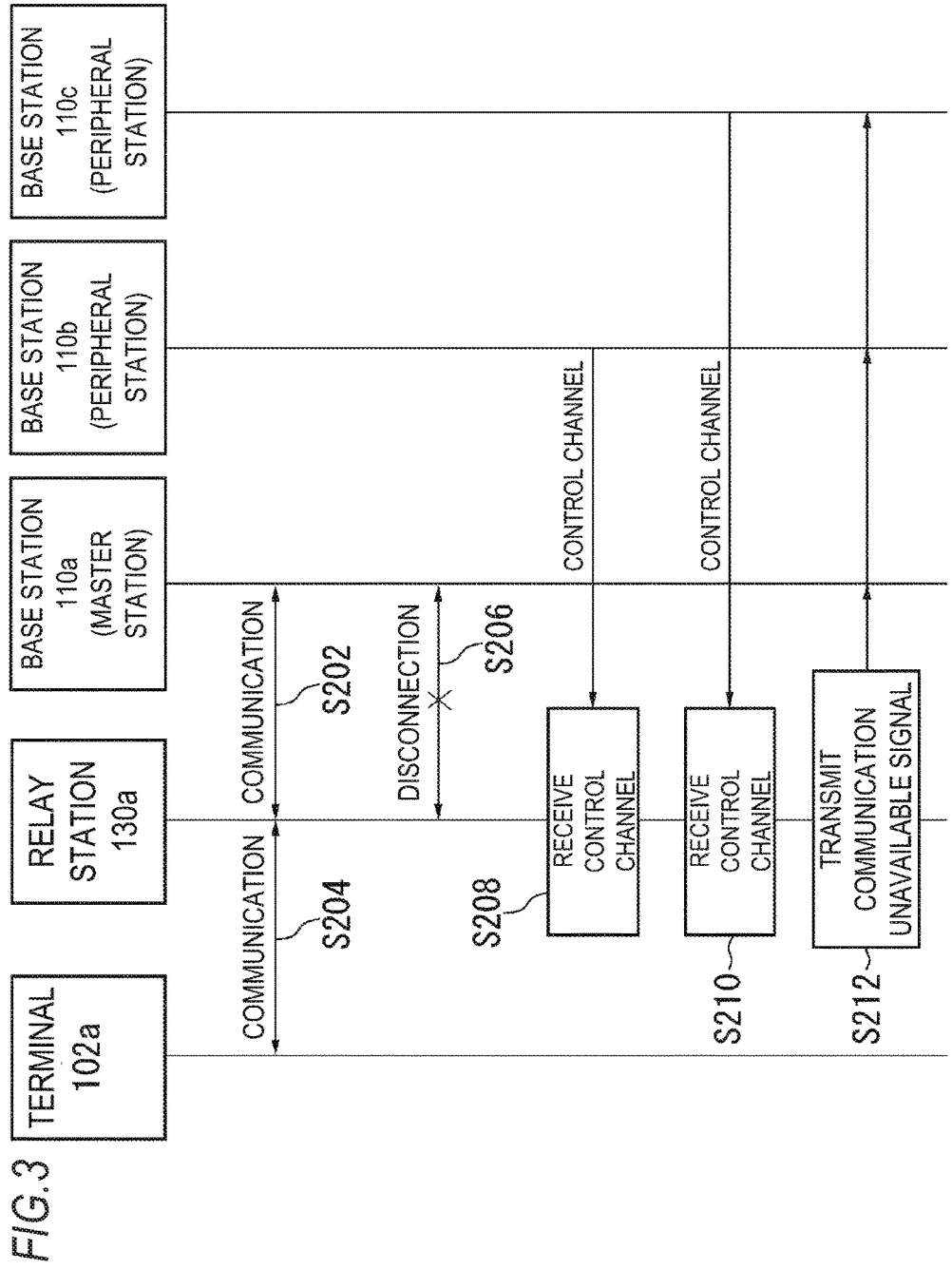

RADIO COMMUNICATION SYSTEM, RELAY STATION AND BASE STATION

CROSS-REFERENCE TO RELATED APPLICATION

This application claims priority from Japanese Patent Application No. 2016-011746 filed on Jan. 25, 2016, the entire subject matter of which is incorporated herein by reference.

TECHNICAL FIELD

This disclosure relates to a radio communication system which includes a plurality of base stations and a relay station which relays communication with any one of the plurality of base stations.

BACKGROUND

A terminal such as a personal handyphone system (PHS) and a mobile telephone are typically connected to a network through a base station. In a commercial complex or an underground passage where radio waves hardly reach, and a mountainous region where an ISDN line and an optical line for the base station are hardly installed, there may be installed a relay station which relays radio communication between the base station and a radio terminal. The relay station includes a terminal-side communication unit and a base-station-side communication unit. The terminal-side communication unit communicates with the terminal, and the base-station-side communication unit communicates with the base station. Therefore, the communication between the base station and the terminal is relayed (for example, see JP-A-2012-15867).

Some of the relay stations have a directional antenna which enables the communication with the base station at a remote place (for example, see JP-A-2014-233004). Therefore, in a case where a radio wave environment of the base station installed near is not appropriate, the base station at a remote place in a good radio wave environment can be connected, so that it is possible to provide a more stable communication service.

SUMMARY

This disclosure is to provide a radio communication system, a relay station, and a base station which can avoid the communication disabled state due to the interference of the peripheral base station and can perform a stable communication with respect to the relay station and a master station.

A radio communication system according to this disclosure includes: a plurality of base stations; and a relay station, which relays communication between any one of the plurality of base stations and a terminal, wherein the plurality of base stations include a master station, which communicates with the relay station, and a peripheral base station, which does not communicate with the relay station, and wherein when a signal of a control channel of the master station is not able to be received, the relay station transmits a communication unavailable signal to the master station and the peripheral base station.

A relay station according to this disclosure includes: a controller; and a communication unit, which is controlled by the controller to relay communication between one of a plurality of base stations and a terminal, wherein in a case where a base station connected to the relay station is referred to as a master station and where a base station not connected thereto is referred to as a peripheral base station among the plurality of base stations, the relay station transmits a communication unavailable signal to the master station and the peripheral base station when a signal of a control channel of the master station is not able to be received.

A base station according to this disclosure includes a controller; and a communication unit, which is controlled by the controller to communicate with a terminal through a relay station, wherein a transmission timing of a control channel is changed when a communication unavailable signal indicating that the relay station is not able to receive a signal of the control channel of the base station is received from the relay station.

According to this disclosure, it is possible to provide a radio communication system, a relay station, and a base station which can avoid the communication disabled state due to the interference of the peripheral base station and can performs a stable communication with respect to the relay station and a master station.

BRIEF DESCRIPTION OF THE DRAWINGS

The foregoing and additional features and characteristics of this disclosure will become more apparent from the following detailed descriptions considered with the reference to the accompanying drawings, wherein:

FIGS. 2A and 2B are functional block diagrams schematically illustrating configurations of a base station and a relay station according to the embodiment:

FIG. 3 is a sequence diagram illustrating a process in the radio communication system according to the embodiment;

SUMMARY

Hereinafter, preferred embodiments of this disclosure will be described with reference to the accompanying drawings. Dimensions, materials, and other numerical values shown in the embodiments are given as merely exemplary in order to help with understanding of this disclosure, and not limit this disclosure if not otherwise specified. In the present specification and drawings, elements having substantially the same function and configuration will be assigned with the same symbol, and a redundant description will be omitted. Elements having no immediate relationship to this disclosure will be omitted from the drawings.

Figure 1:
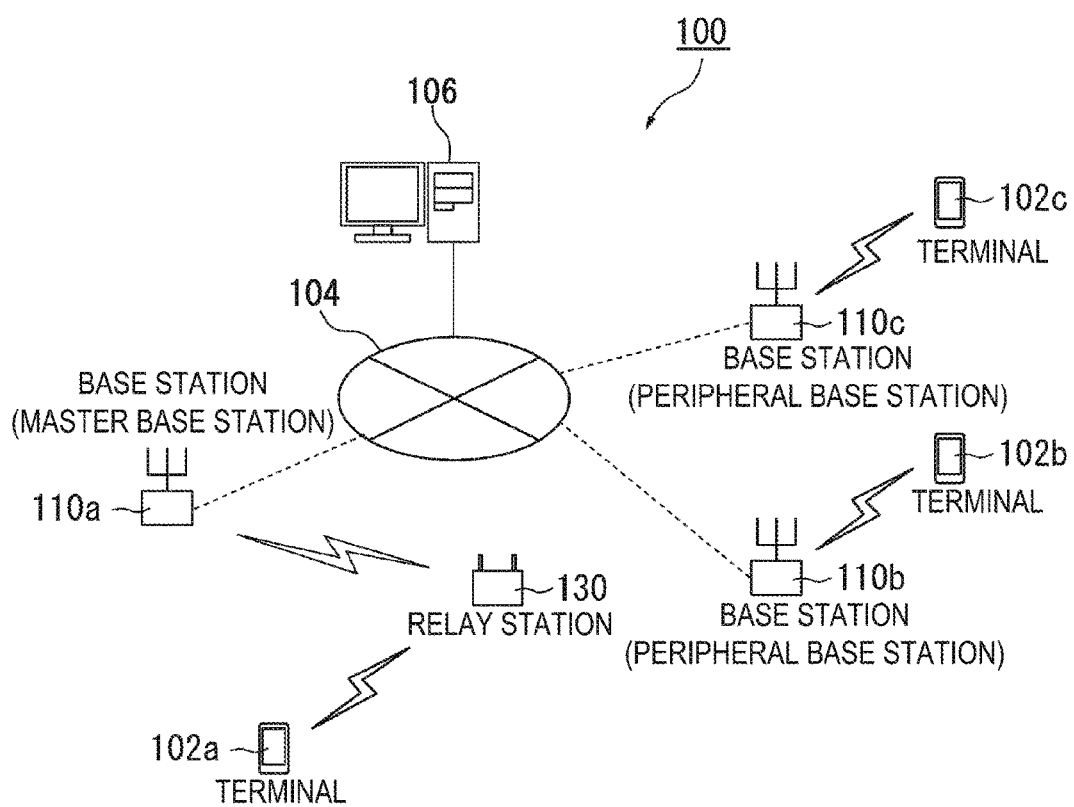
FIG. 1 is a diagram illustrating a radio communication system according to an embodiment.

FIG. 1 is a diagram illustrating a radio communication system 100 according to this disclosure. The description in this embodiment will be made about the radio communication system 100 illustrated in FIG. 1 in detail, and also made about base stations 110*a*, 110*b*, and 110*c* and a relay station 130.

As illustrated in FIG. 1, the radio communication system 100 of this embodiment includes the plurality of base stations 110*a*, 110*b*, and 110*c* and the relay station 130. The plurality of base stations 110*a*, 110*b*, and 110*c* are connected to a server 106 through a communication network 104. The base station 110*a* communicates with a terminal 102*a* through the relay station 130. The base stations 110b and 110c communicate with terminals 102b and 102c without using the relay station 130. The base station 110, the relay station 130, and the terminal 102 perform the communication in a time division duplex manner.

The relay station 130 communicates with any one of the plurality of base stations 110a, 110b, and 110c, and relays the communication between the subject base station and the terminal. In this embodiment, the relay station 130 relays the communication between the base station 110a and the terminal 102a. Therefore, the base station 110a communicating with the relay station 130 in this embodiment will be described as a master station. The base stations 110b and 110c not communicating with the relay station 130 will be described as peripheral base stations.

FIGS. 2A and 2B are functional block diagrams schematically illustrating configurations of the base stations 110a and the relay station 130 according to this embodiment. FIG. 2A is a functional block diagram illustrating the configuration of the base station 110a. FIG. 2B is a functional block diagram illustrating the configuration of the relay station 130. The base stations 110a, 110b, and 110c in this embodiment have the same configuration, and thus the description will be made by illustrating the base station 110a.

As illustrated in FIG. 2A, the base station 110a includes a base station controller 112, a communication unit 114, and a line connection unit 116. The base station controller 112 is configured by a semiconductor integrated circuit (not illustrated) equipped with a central processing unit (CPU), and manages and controls the entire base station 110a.

The communication unit 114 is connected to an antenna 114a, and transmits/receives (communicates) a signal with respect to the relay station 130 or the terminal (the relay station 130 in FIG. 2A) through the subject antenna 114a. The line connection unit 116 is connected to the communication network 104, and transmits/receives information with respect to the server 106 through the subject communication network 104.

As illustrated in FIG. 2B, the relay station 130 includes a relay station controller 132, a terminal-side communication unit 134, and a base-station-side communication unit 136. The relay station controller 132 is configured by a semiconductor integrated circuit (not illustrated) equipped with a central processing unit (CPU), and manages and controls the entire relay station 130.

The terminal-side communication unit 134 is connected to an antenna 134a, and transmits/receives a signal with respect to the terminal 102a through the subject antenna 134a. The base-station-side communication unit 136 is connected to an antenna 136a, and transmits/receives a signal with respect to the base station 110a through the subject antenna 136a.

FIG. 3 is a sequence diagram illustrating a process in the radio communication system 100 according to this embodiment. In the following description, the base station 110a among the plurality of base stations 110a to 110c will be referred to as a master station which communicates with the relay station 130, and the base stations 110b and 110c will be referred to as peripheral base stations which do not communicate with the relay station 130.

As illustrated in FIG. 3, the relay station 130 relays communications by performing the communication with the master station (the base station 110a) and the terminal 102a (Step S202 and Step S204). Thereafter, the communication is stopped due to a failure of the master station, a regular monitoring, or a maintenance, and the communication with the master station is disconnected (Step S206).

The relay station 130 receives a signal of a control channel which is transmitted by the base stations (peripheral base stations) 110b and 110c (Steps S208 and S210). Then, the relay station 130 is synchronized with the peripheral base station. The relay station 130 receives the signal of the control channel from the peripheral base station.

Herein, although the master station transmits the signal of the control channel in a normal mode, the relay station 130 is interfered due to receiving the signal of the control channel from the peripheral base station at the same timing. Therefore, the control channel from the master station may be not recognized. The reason why the relay station 130 is not able to receive the signal of the control channel from the master station (the base station 110a) is assumed as that the signal of the control channel from any one of the peripheral base stations (110b and 110c) is interfered. When the relay station communicates with the base station at a remote place as the master station, such interference may occur apparently.

Then, the relay station 130 transmits a communication unavailable signal (Step S212). Herein, the relay station 130 transmits the communication unavailable signal to all the peripheral base stations (in this example, the base stations 110b and 110c) which have received the signal of the control channel. The relay station 130 may transmit the communication unavailable signal in an low modulation manner, as far as possible, such that the communication unavailable signal indicates the identification information of the master station and that the reception have not been made.

In the TDD manner, a downlink slot and an uplink slot in the same frequency are transmitted and received alternately. The downlink slot is a slot at which the control channel is transmitted from the base station, and the uplink slot is a slot at which the communication unavailable signal is transmitted from the relay station to the base station. The expression "the communication unavailable signal is transmitted" also means that the communication unavailable signal is transmitted at the uplink slot "corresponding" to the downlink slot where the control channel is transmitted.

Figure 4:
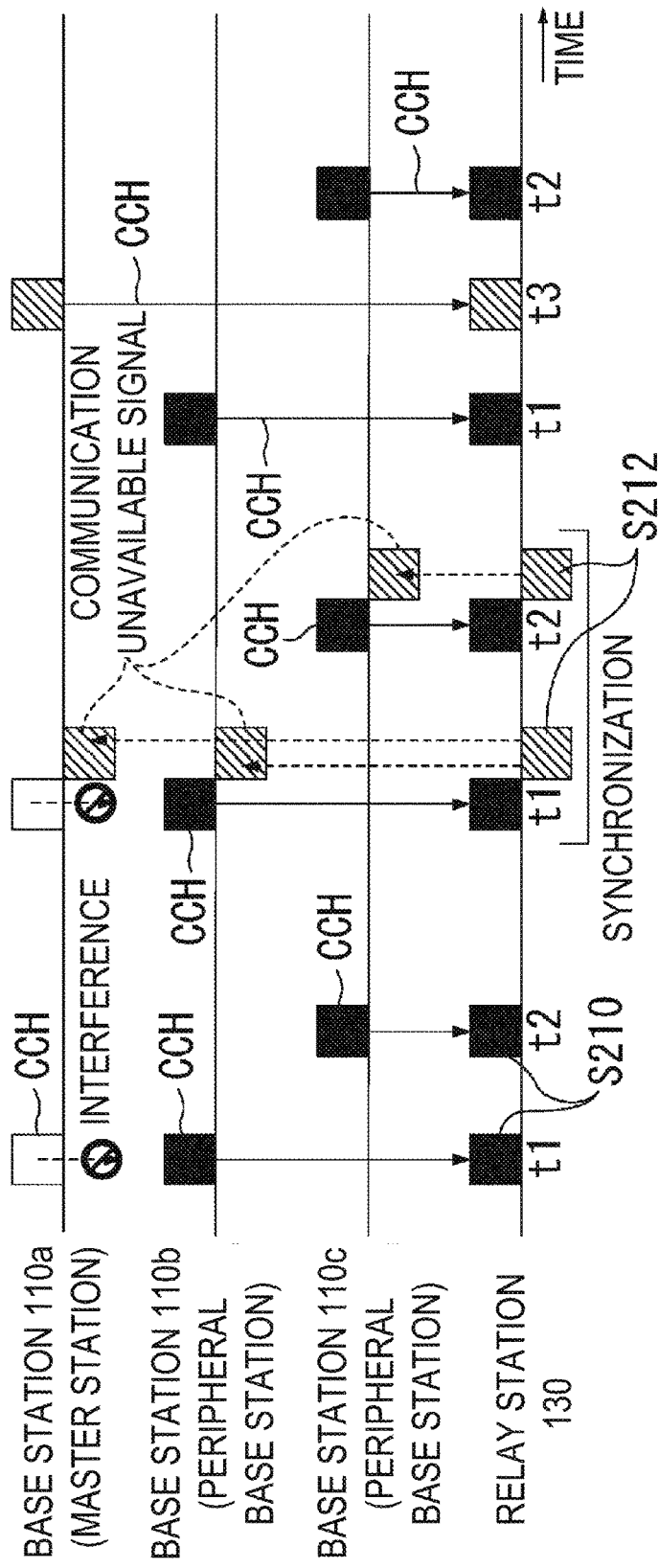
FIG. 4 is a timing chart illustrating a first example of the radio communication system according to the embodiment.
Figure 5:
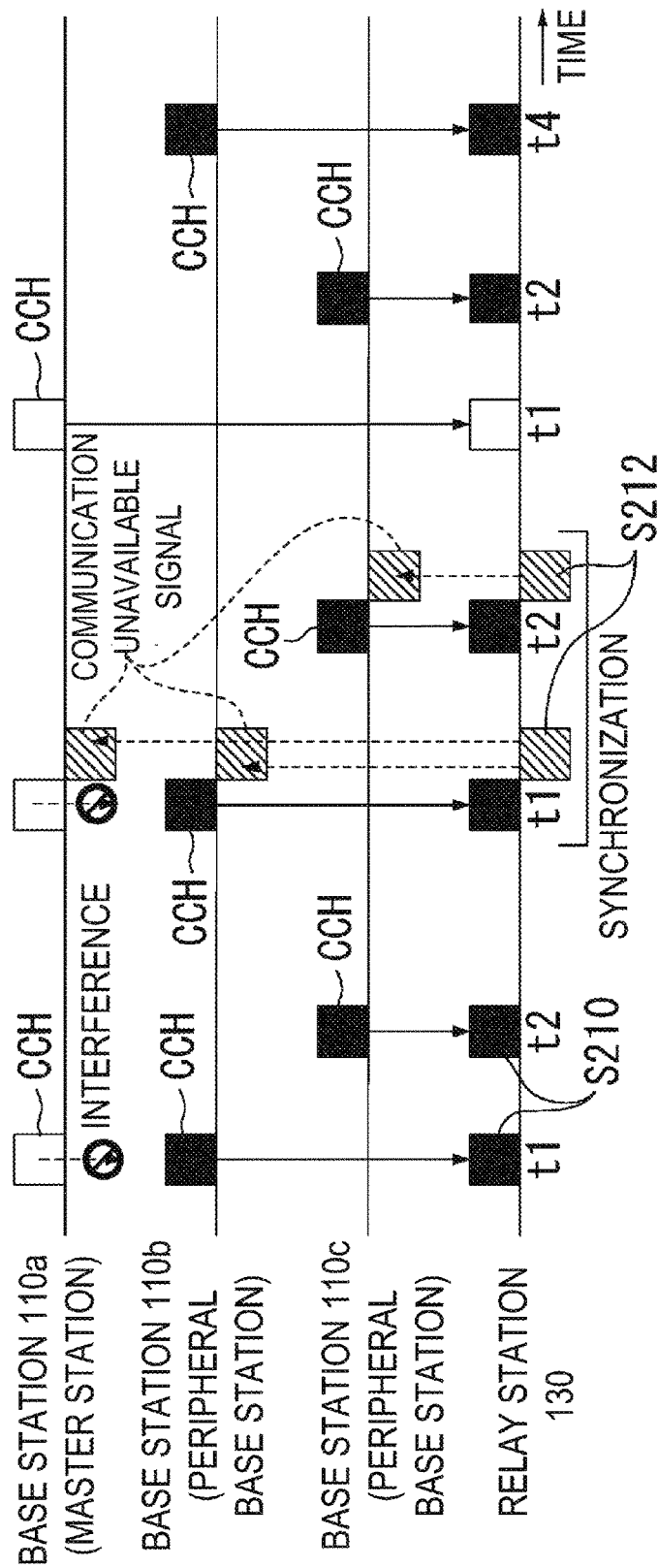
FIG. 5 is a timing chart illustrating a second example of the radio communication system according to the embodiment.

FIG. 4 is a timing chart illustrating a first example of the radio communication system according to this embodiment. In the drawing, the control signal is denoted by "CCH". In FIGS. 4 and 5, the downlink slots each are denoted by t1, t2, t3, and t4.

In FIG. 4, the control signals of the base station (the master station) 110a and the base station (the peripheral base station) 110b are transmitted at the same slot t1. Therefore, the control signal of the base station 110b causes the interference, and the control signal from the base station 110a is not possible to be received by the relay station 130.

As described above, when the control signal from the master station is not possible to be received (that is, the communication with the master station is disconnected), the relay station 130 is synchronized by receiving the control signal from the other peripheral base station. In FIG. 4, the relay station 130 receives the control signals from the base stations 110b and 110c and is synchronized with these base stations. Then, the relay station 130 transmits the communication unavailable signal by using a slot synchronized with these base stations 110b and 110c (that is, in accordance with the slots t1 and t2 at which the control signals are received from these base stations 110b and 110c).

As illustrated in FIG. 4, the base station (the master station) 110a according to the first example of the radio communication system 100 of this embodiment changes the slot of the control channel from t1 to t3 when receiving the communication unavailable signal from the relay station 130. After transmitting the communication unavailable signal, the relay station 130 performs hearing of the control channel during a period sufficient for receiving the control channel from the base station 110a (for example, one or two super frames), and receives the control channel of the master station at the slot t3.

By changing the slot of the control channel, it is possible to avoid that the transmission timings (slots) of the control signals of the master station (the base station 110a) and the interfering peripheral base station (the base station 110b) are overlapped. Therefore, the control signal from the master station can be received in the relay station 130. Accordingly, even when the timings (slots) of the control channels of the master station and the peripheral base station are overlapped, the communication between the relay station and the master station is recovered, and the relay station 130 and the master station can obtain a stable communication.

The description in the first example has been made about the relay station 130 which transmits the communication unavailable signal with respect to all the peripheral base stations (the base stations 110b and 110c) which have received the signal of the control channel, but this disclosure is not limited thereto. For example, the relay station 130 may transmit the communication unavailable signal to the peripheral base station of which the radio wave intensity is equal to or more than a predetermined value among the peripheral base stations. In other words, only the peripheral base station having a strong radio wave intensity enough to interrupt the reception of the control channel from the master station may be targeted.

The relay station 130 may measure and store, in advance, the radio wave intensity of the control channel arrived from the master station (in this case, an average radio wave intensity or the previous radio wave intensity), and transmit the communication unavailable signal to the peripheral base station having a radio wave intensity higher than that of the master station among the peripheral base station.

Furthermore, the relay station 130 may indicate the reception timing of the control channel of the peripheral base station, in the communication unavailable signal. According to this configuration, the master station can change the transmission timing of its own control channel to avoid the reception timing of the control channel of the peripheral base station indicated by the received communication unavailable signal. Therefore, the master station can securely avoid the transmission timing of the control channel of the peripheral base station when the transmission timing of the control channel is changed, and can securely achieve the above-described effects.

In general, a plurality of base stations are installed in the vicinity of a relay station. The relay station communicates with a base station of which the communication state is appropriate among the base stations. However, some of the base stations have a function of serving as a master station of the relay station, and some of them are old-type base stations which are not able to serve as the master station of the relay station. In this case, the relay station is connected to the base station serving as the master station at a little bit distance away even though the base station not serving as the master station is located in a short distance away. Herein, the base station that performs a communication with the relay station will be referred to as the master station, and the base station that does not perform communications will be referred to as a peripheral base station. In this case, when the relay station performs a communication with the base station as the master station, the base station near the relay station becomes the peripheral base station.

The base station may transmit a control channel at a timing different from the previous one when the service restarts after being stopped due to a regular monitoring or maintenance. At this time, when the master station and the peripheral base station cannot recognize the radio wave to each other because the master station and the peripheral base station are away from each other, the master station and the peripheral base station set the control channel at the same timing. Then, the control channel of the peripheral base station causes interference. Therefore, there is a concern that the relay station is not able to receive the control channel of the master station. In this case, the relay station cannot determine whether the master station stops the service or whether the radio wave is interfered, and thus the communication is not possible.

According to this embodiment, a radio communication system, a relay station, and a base station can avoid the communication disabled state due to the interference of the peripheral base station and can perform a stable communication with respect to the relay station and a master station.

FIG. 5 is a timing chart illustrating a second example of the radio communication system 100 according to this embodiment. In the following description, the operations similar the operations described in FIGS. 3 and 4 will be omitted.

As illustrated in FIG. 5, the second example of the radio communication system 100 of this embodiment corresponds to a case where the base station 110b which is not the master station is recognized as causing the interference. When the base station 110b receives the communication unavailable signal, the base station (the peripheral base station) 110b which transmits the interfering control signal changes the slot of the control channel from t1 to t4. The base station (the master station) 110a does not change the slot of the control channel.

Although it is not illustrated in the drawing, in a case where all the base stations are not able to recognize that oneself cause the interference, when the peripheral base station (not the master station) receives the communication unavailable signal, the peripheral base station changes the slot of the control channel. In this case, the changed slot of the control channel may become the same as that of the master station. However, when the communication unavailable signal is repeatedly transmitted, the control channels of the master station and the peripheral base station do not come to be overlapped. In particular, as the empty slot is increased, a possibility that the slots are not overlapped is increased.

In this way, even when the peripheral base station changes the timing of the control channel, it is possible to avoid the overlapping between the transmission timings of the control signal of the master station and the interfering peripheral base station. The similar effects to the first example can be obtained.

Hitherto, the preferred embodiments of this disclosure have been described with reference to the accompanying drawings, but it is a matter of course that this disclosure is not limited to these examples. A person skilled in the art can easily conceive various changes or modifications within a range of claims. It can be understood that these changes and modifications are also deservedly belonging to a technical scope of this disclosure.

The respective processes in the radio communication relaying method of this specification are not necessarily performed in time sequence manner along the order described in the flowchart and the sequence diagrams, and may be performed in parallel or by subroutines.

This disclosure may be employed to: a radio communication system which includes a plurality of base stations and a relay station which relays communication between any one of the plurality of base stations and a terminal; a relay station which relays communication between any one of the plurality of base stations and the terminal; and a base station which communicates with the terminal through the relay station.

What is claimed is:

1. A radio communication system comprising:
    a plurality of base stations; and
    a relay station, which relays communication between any one of the plurality of base stations and a terminal,
    wherein the plurality of base stations include a master station, which communicates with the relay station, and a peripheral base station, which does not communicate with the relay station,
    wherein in response to a signal of a control channel transmitted by the master station is not able to be received by the relay station, the relay station transmits a communication unavailable signal to the master station and the peripheral base station,
    wherein the master station changes a transmission timing of the control channel when the communication unavailable signal is received,
    wherein the relay station indicates a reception timing of the control channel of the peripheral base station, in the communication unavailable signal, and
    wherein when the communication unavailable signal is received, the master station changes the transmission timing of the control channel to avoid the reception timing of the control channel of the peripheral base station.

2. The radio communication system according to claim 1, wherein the relay station transmits the communication unavailable signal to the peripheral base station which receives a radio wave intensity higher than that of the master station among the peripheral base stations.

3. The radio communication system according to claim 1, wherein the relay station transmits the communication unavailable signal to the peripheral base station of which a radio wave intensity is equal to or more than a predetermined value among the peripheral base stations.

4. The radio communication system according to claim 1, wherein the peripheral base station changes a transmission timing of the control channel when the communication unavailable signal is received.

5. A relay station comprising:
    a controller; and
    a communication unit, which is controlled by the controller to relay communication between one of a plurality of base stations and a terminal,
    wherein in a case where a base station connected to the relay station is referred to as a master station and where a base station not connected thereto is referred to as a peripheral base station among the plurality of base stations, the relay station transmits a communication unavailable signal to the master station and the peripheral base station in response to a signal of a control channel transmitted by the master station is not able to be received by the relay station,
    wherein the master station changes a transmission timing of the control channel when the communication unavailable signal is received,
    wherein the relay station indicates a reception timing of the control channel of the peripheral base station, in the communication unavailable signal, and
    wherein when the communication unavailable signal is received, the master station changes the transmission timing of the control channel to avoid the reception timing of the control channel of the peripheral base station.

6. A base station, comprising:
    a controller; and
    a communication unit, which is controlled by the controller to communicate with a terminal through a relay station,
    wherein a transmission timing of a control channel is changed in response to a communication unavailable signal indicating that the relay station is not able to receive a signal of the control channel transmitted by the base station is received from the relay station,
    wherein the controller changes the transmission timing of the control channel when the communication unavailable signal is received,
    wherein the relay station indicates a reception timing of the control channel of a peripheral base station, in the communication unavailable signal, and
    wherein when the communication unavailable signal is received, the controller changes the transmission timing of the control channel to avoid the reception timing of the control channel of the peripheral base station.

* * * * *